Patented Sept. 18, 1928.

1,684,873

UNITED STATES PATENT OFFICE.

ERSKINE DANIEL LORD, OF CAMBRIDGE, MASSACHUSETTS, ASSIGNOR TO McLAURIN-JONES CO., OF BROOKFIELD, MASSACHUSETTS, A CORPORATION OF MASSACHUSETTS.

MELTABLE ADHESIVE.

No Drawing. Application filed July 11, 1924. Serial No. 725,392.

This invention relates to adhesives, and more particularly to meltable adhesives suitable for use as the coatings of stays, sealing tapes, and the like.

Heretofore it has been the usual practice to use a water soluble adhesive coating on sealing tape, stays, and similar material, but such a coating is open to the objection that it is likely to soften when exposed to a moist atmosphere, and when so softened it loses its adhesive properties, thus permitting the parts united by the stay or sealing strip to separate, particularly if they are under strain. With a view to overcoming this objection it has been proposed heretofore to use an adhesive for this purpose which would be waterproof, hard and non-tacky at normal temperatures, but which could be rendered tacky by heating to a point somewhat above normal temperatures. While the advantages of stays and sealing strips coated with such an adhesive are generally recognized, they have not gone into use to any substantial extent chiefly because of the unsatisfactory nature of the adhesives that have been developed for this purpose.

In general it may be stated that an adhesive satisfactory for the uses just mentioned should have the following characteristics:

First: It should be both waterproof and moldproof, the latter term referring to the fungus or vegetable growth commonly known as "mold".

Second: The adhesive should not deteriorate with age but should permanently retain its adhesive properties.

Third: It is very important that the adhesive should not undergo any serious change in characteristics due to normal changes in temperatures. That is, some adhesives which otherwise are suitable for this purpose become so brittle at freezing temperatures that they lose their adhesive properties. The adhesive must have ample bonding strength over the entire range of normal temperatures and must retain its adhesiveness both at freezing temperatures, and also at atmospheric temperatures which are commonly regarded as high, such, for example, as 100° F.

Fourth: The adhesive and a sealing strip including the same must be capable of being produced at a reasonable cost. In other words, the ingredients of the adhesive compound must be relatively inexpensive, the cost of compounding or mixing must not be excessive, and the material must be of such a nature that it can be applied to a cloth or paper backing economically and prefarably by means of the ordinary coating machinery.

To devise an adhesive which will satisfy the requirements above outlined, constitutes the chief object of this invention.

The testing of a great variety of materials, compounds, and mixtures, has demonstrated that a fatty acid pitch, such as stearine or cotton seed pitch, forms the most suitable base for an adhesive having the desired characteristics. This pitch does not run uniformly in consistency, but I have found that those grades of stearine pitch which are relatively rubbery and not excessively tacky are very suitable for this purpose if combined with a small quantity of paraffin wax. The wax seems to have the effect of improving the spreading qualities of the mixture and reducing the surface tackiness of the compound at ordinary temperatures. For example, ten parts of stearine pitch having a melting point of approximately 170° F. when mixed with one part of paraffin wax forms a very satisfactory adhesive for the purpose above described. Instead of paraffin wax, other materials of a waxy nature may be used, such, for example, as bees wax, Japan wax, tallow, or the like.

A softer stearine pitch than that above mentioned requires different treatment. A suitable waterproof adhesive may be made by mixing approximately ten parts of soft stearine pitch with two to twenty parts of hard asphaltum, fifteen to forty parts of soft asphaltum and from two to ten parts of paraffin. To be somewhat more specific, two formulæ which I have found satisfactory and which utilize this softer grade of stearine pitch, are as follows:

| | Formula II. Parts. | Formula III. Parts. |
|---|---|---|
| Stearine pitch | 10 | 10 |
| Soft asphaltum | 38 | 20 |
| Hard asphaltum | 15 | 4 |
| Paraffin | 5.5 | 8 |

The stearine pitch used in the formulæ just given has a melding point of about 130° F. The soft asphaltum is the residue remaining after distillation of mineral oils of the asphaltic or mixed base variety and has a melting point of about 225° F., while the hard asphaltum preferably consists of gilsonite, or a brittle coal tar pitch. This grade of stearine pitch is soft and sticky, and the hard asphaltum hardens and strengthens the mixture, while the wax has the opposite effect in that it weakens the mixture but still has the very desirable result of rendering it free flowing and easy to apply in coating machinery. At the same time it reduces the surface stickiness at ordinary temperatures. The soft asphaltum is added to partially counteract both the extreme brittleness of the hard asphaltum and also the inherent weakness of the wax. Soft coal tar pitch may be substituted for the asphaltic oil residue above mentioned.

In compounding such a mixture, care should be taken not to use too large a proportion of asphaltum since my investigations have indicated that a certain amount of stearine pitch is absolutely necessary to the attainment of satisfactory results, and that asphaltum cannot be substituted for it.

The formulæ above given will vary somewhat in expense, the first being the most expensive and the last the cheapest. They all satisfy the requirements hereinbefore set forth. They are waterproof and mold proof, are not sticky at normal atmospheric temperatures, and retain their strength at freezing temperatures. When melted they spread readily on cloth or paper, and form a firm union with the materials on which stays and sealing strips ordinarily are used. It may be noted that the adhesive produced by formula No. 2 is slightly stronger at ordinary temperatures than formula No. 3, but is not quite as strong at freezing temperatures.

A sealing strip or stay coated with this adhesive is usually applied to the article to which it is to be affixed by pressing it against the article with a hot iron, the heat of the iron softening the adhesive coating and rendering it tacky. The adhesive subsequently sets upon cooling after the iron has been removed. A stay or sealing strip coated with this adhesive is particularly adapted for the manufacture of paper and cardboard boxes, the sealing and manufacture of cartons, especially those intended for ocean shipment, and has various other uses.

It will be understood that while I have above given formulæ which have proved very satisfactory, that some latitude in ingredients and in their proportions is allowable, and that the ingredients used and their proportions will vary somewhat with the use to which the adhesive is to be put, the market prices of the ingredients, and various other conditions.

Having thus described my invention, what I desire to claim as new is:

1. A meltable waterproof adhesive comprising a substantial percentage of fatty acid pitch, and a smaller percentage of wax.

2. A meltable waterproof adhesive comprising substantial percentages of a fatty acid pitch and asphaltum, and a small percentage of paraffin.

3. A waterproof adhesive which is hard and non-tacky at normal temperatures but is adapted to become tacky when heated to temperatures substantially above normal, comprising a base of stearine pitch and a sufficient percentage of a wax to enable the adhesive to spread smoothly when softened by heat.

4. A meltable waterproof adhesive comprising approximately ten parts of stearine pitch mixed with from two to twenty parts of hard asphaltum, fifteen to forty parts of soft asphaltum, and from two to ten parts of paraffin.

5. A waterproof adhesive which is hard and non-tacky at normal temperatures but is adapted to become tacky when heated to temperatures substantially above normal, comprising a base of stearine pitch mixed with substantial percentages of hard asphaltum and soft asphaltum, and a sufficient quantity of a soft wax to cause the entire mixture to spread freely when softened by heat.

6. A waterproof adhesive, which is hard and non-tacky at normal temperatures, but is adapted to become tacky when heated to temperatures somewhat above normal and which comprises a mixture of stearine pitch and paraffin wax in the proportions of ten parts of the pitch to from one to ten parts of the wax.

ERSKINE DANIEL LORD.